UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

DYE-STUFF MADE FROM DIAZO-NAPHTHALINE.

SPECIFICATION forming part of Letters Patent No. 332,528, dated December 15, 1885.

Application filed June 9, 1885. Serial No. 168,150. (No specimens.) Patented in England January 5, 1884, No. 816, and in France January 29, 1884, No. 159,993.

*To all whom it may concern:*

Be it known that I, MEINHARD HOFFMANN, doctor of philosophy, a citizen of the Kingdom of Prussia, and a resident of Mainkur, near Frankfort-on-the-Main, Germany, have invented a new and useful Improvement in the Production of Coloring-Matter, of which the following is a specification.

My invention relates to a new dye-stuff which results from the reaction of diazo-naphthaline with the gammadisulphonic acid of beta-naphthol in alkaline solution.

The preparation and properties of my new gammadisulphonic acid of beta-naphthol I have described in United States application for Letters Patent, (Serial No. 120,040,) filed February 7, 1884.

In order to produce a red coloring-matter I thoroughly mix one hundred parts of alpha-napthylamine with two hundred and forty parts of muriatic acid of 20° Baumé and a sufficient quantity of water, and prepare the diazo compound by the addition of forty-eight parts of nitrite of soda in aqueous solution. The solution of the diazo compound is poured into the aqueous solution of two hundred and seventy parts of beta-naphtholgammadisulphonate of potassium and two hundred parts of carbonate of soda and kept cold by the addition of ice. The color is not formed instantaneously, but gradually the diazo compound disappears, and the coloring-matter is deposited in form of a red precipitate, from which I obtain the coloring-matter by recrystallization in the form of needles shining like gold. The color dissolves easily in hot water, difficultly in cold water. In strong sulphuric acid it dissolves with a reddish blue shade, and the solution does not deposit by diluting it with water.

The new coloring-matter dyes wool, silk, and other materials a brilliant bluish-red shade. It is characterized by its great tendency to crystallize.

Having thus described my invention, what I claim as new, and desire to secure by Letters Patent, is—

As a new product, the herein-described dye-stuff or coloring-matter, of a reddish or scarlet color, and capable of dyeing shades of reddish blue, as set forth.

In testimony that I claim the foregoing as my invention I have signed my name, in presence of two witnesses, this 15th day of May, 1885.

MEINHARD HOFFMANN.

Witnesses:
ADOLF GANS,
JEAN GRUND.